United States Patent [19]

Kato

[11] Patent Number: 5,673,671

[45] Date of Patent: Oct. 7, 1997

[54] FUEL INJECTED ENGINE

[75] Inventor: Masahiko Kato, Hamamatsu, Japan

[73] Assignee: Sanshin Kogyo Kabushiki Kaisha, Hamamatsu, Japan

[21] Appl. No.: 656,793

[22] Filed: May 31, 1996

[30] Foreign Application Priority Data

May 31, 1995 [JP] Japan ................................ 7-134208

[51] Int. Cl.$^6$ ........................ F02M 55/02; F02B 31/00; F02D 9/08
[52] U.S. Cl. ........................ 123/470; 123/308; 123/337
[58] Field of Search ........................ 123/470, 472, 123/531, 308, 337, 590

[56] References Cited

U.S. PATENT DOCUMENTS

| | | | |
|---|---|---|---|
| 3,620,195 | 11/1971 | Lamm | 123/337 |
| 3,656,464 | 4/1972 | Hiborn | 123/470 |
| 4,158,352 | 6/1979 | Blatter | 123/337 |
| 4,348,997 | 9/1982 | Takeda et al. | 123/590 |
| 4,922,866 | 5/1990 | Staerzl et al. | 123/470 |
| 5,167,211 | 12/1992 | Fukuma et al. | 123/470 |
| 5,255,648 | 10/1993 | Hokazono et al. | 123/308 |
| 5,421,311 | 6/1995 | Wataya | 123/531 |
| 5,501,194 | 3/1996 | Kanehara et al. | 123/470 |
| 5,551,392 | 9/1996 | Yamaji et al. | 123/308 |

*Primary Examiner*—Thomas N. Moulis
*Attorney, Agent, or Firm*—Knobbe, Martens, Olson & Bear LLP

[57] ABSTRACT

A fuel injection system for an internal combustion engine utilizing manifold injection with the injector positioned downstream of a flow controlling throttle valve. The throttle valve is provided with a flow passage that intersects the spray axis of the injector to provide good fuel vaporization and distribution even at low speeds.

13 Claims, 4 Drawing Sheets

FUEL INJECTED ENGINE

BACKGROUND OF THE INVENTION

This invention relates to a fuel injected engine and more particularly to an improved manifolding, throttle valve and injector arrangement for such engines.

It has been generally acknowledged that the performance of an engine including fuel economy and exhaust emission control may be improved significantly by utilization of fuel injectors. Although a variety of injector locations has been suggested and proposed, the one that enjoys the most success is so-called "manifold injection". With this type of arrangement, the fuel injectors are mounted in the intake manifold and spray into its manifold passages for distribution to the combustion chamber through the remaining portion of the induction system of the engine.

Although there may be some advantages to direct cylinder injection, this expedient is more expensive than manifold injector. The timing of injection for direct cylinder injection is much more critical than manifold injection. In addition, when the injector is mounted directly in the combustion chamber, it must be capable of withstanding the high combustion temperatures and pressures. This results in the necessity to utilize more expensive injectors.

Manifold injection, on the other hand, does not have these disadvantages. There is, however, one running condition when the operation of the manifold injection can be improved. This is low speed, low throttle opening running conditions.

Generally, the fuel injector injects into the induction system downstream of the throttle valve. This ensures against the deposition and collection of fuel on the throttle valve. However, under speed, low load conditions when the throttle valve opening is small, the velocity in the intake passage is also quite low. This presents a number of potential disadvantages.

The first of these is that the fuel is more likely to become deposited on the intake passage walls and result in erratic fuel distribution to the actual combustion chamber. The other, somewhat related, problem is that the fuel that does enter into the air flow may not enter where the air is flowing at its highest velocity and, thus, the fuel that does not directly impinge on the induction passage walls may nevertheless fail to be carried into the combustion chamber by the air stream.

It is, therefore, a principal object of this invention to provide an improve manifold-type fuel injection system for an engine.

It is another object of this invention to provide a fuel injection system for an engine wherein the manifold mounted injector is inter-related with the throttle valve in such a way that it will spray in a high velocity area even when the engine is running at low speeds and low loads.

It is a further object of this invention to provide an improved throttle valve arrangement that can be utilized with manifold fuel injection to improve running under load speed, low load conditions.

SUMMARY OF THE INVENTION

This invention is adapted to be embodied in a fuel injection system for an internal combustion engine having an induction passage communicating at its downstream end with a combustion chamber. A throttle valve is provided in the intake passage for controlling the flow therethrough. A fuel injector injects fuel into the induction passage downstream of the throttle valve, but in proximity to the throttle valve when the throttle valve is in its closed position. Means are provided for forming a small effective flow area passage extending across the throttle valve and in line with the spray axis of the fuel injector for causing the fuel injection to pass through a high velocity area for improving distribution and transfer to the combustion chamber.

DETAILED DESCRIPTION OF THE PREFERRED EMBODIMENT OF THE INVENTION

Figure 1:
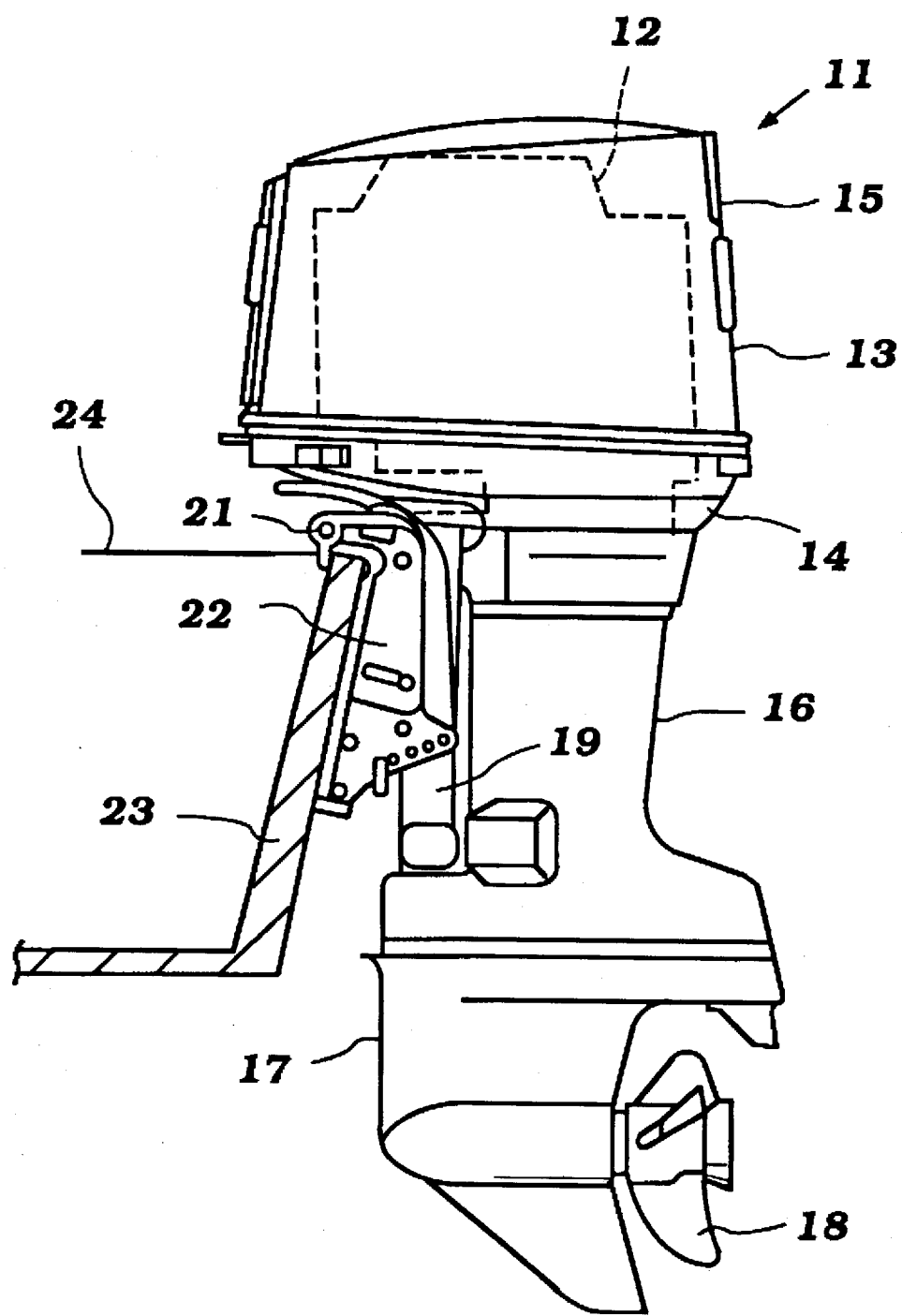
FIG. 1 is a side elevational view of an outboard motor constructed in accordance with an embodiment of the invention.

Referring first to FIG. 1, an outboard motor constructed and operated in accordance with an embodiment of the invention is identified generally by the reference numeral 11. The invention is described in conjunction with an outboard motor such as the outboard motor 11 because it has particular utility to two-cycle engines. The application of the invention to an outboard motor such as the outboard motor 11 has been chosen for illustration purposes because two-cycle engines normally form the power plant for such outboard motor.

While the invention has particular utility with two-cycle engines, the inventive concept may also be applied to four-cycle engines. In addition to being susceptible of use also with outboard motors, the invention also may be utilized with a wide variety of other applications for engines.

The outboard motor 11 includes a power head that is comprised of a powering internal combustion engine, indicated generally by the reference numeral 12 and which is surrounded by a protective cowling, indicated generally by the reference numeral 13. The cowling 13 is comprised of a lower tray portion 14 and an upper, detachable main cowling portion 15.

As will become apparent by reference to the later figures, the engine 12 is mounted in the power head 13 so that an output shaft rotates about a vertically extending axis. This orientation facilitates coupling to a drive shaft (not shown) that depends into and is rotatably journaled within a drive shaft housing 16. Beneath the drive shaft housing 16 is positioned a lower unit 17 where the aforenoted drive shaft drives a propeller 18 mounted on a propeller shaft which is driven through a forward, neutral, reverse transmission contained in the lower unit 17.

The drive shaft housing has affixed to it a steering shaft (not shown). This steering shaft is journaled in a swivel bracket 19 for steering of the outboard motor 11 about a generally vertically extending axis. The swivel bracket 19 is, in turn, pivotally connected by a pivot pin 21 to clamping bracket 22. The pivotal connection provided by the pivot pin 21 permits tilt and trim movement of the outboard motor 11.

The clamping bracket 22 is, in turn, connected to a transom 23 of a watercraft, shown partially and indicated by the reference numeral 24, in a known manner.

As aforenoted, the invention is directed to the engine 12 and specifically its fuel injection and induction system and thus where any details of the outboard motor 11 have not been described or illustrated, they may be considered to be conventional.

Figure 2:
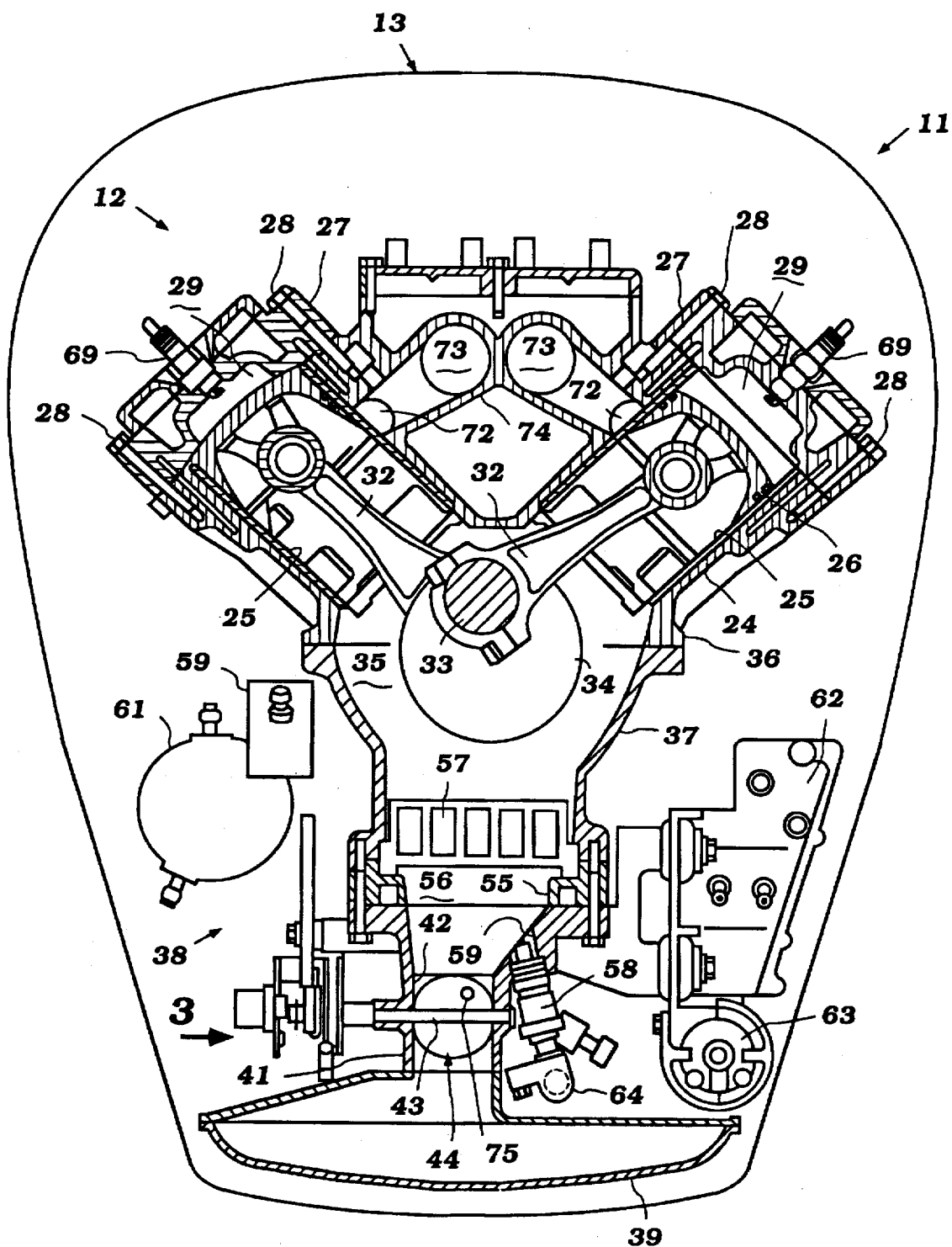
FIG. 2 is a top plan view of the power head of the outboard motor with only the outline of the protective cowling shown and with the engine shown in a cross-sectional view.

Referring now primarily to FIG. 2, it will be seen that the engine 12 is comprised of a cylinder block 24 having a plurality of cylinder bores 25 in which respective pistons 26 are supported for reciprocation. In the illustrated embodiment, the engine 12 is depicted as being of the V-6 type. Accordingly, the cylinder block 24 is divided into a pair of angularly disposed cylinder banks each of which is provided with three cylinder bores 25. As is typical with V-type engine practice, the cylinder bores 25 of the cylinder banks may be staggered slightly with respect to each other. Although the invention is described in conjunction with a V-6 type engine, it will be readily apparent to those skilled in the art how the invention can be employed with engines having other cylinder members and other cylinder configurations.

Continuing to refer to FIG. 2, each cylinder bank formed in the cylinder block 24 is closed by a respective cylinder head assembly 27. The cylinder head assemblies 27 are affixed to the cylinder block 24 in any suitable manner such as by the fasteners 28 which appear in this figure.

Each cylinder head is provided with a plurality of recesses 29 which cooperate with the pistons 26 and cylinder bores 25 so as to form the combustion chambers of the engine. Since, at top dead center, the substantial portion of the clearance volume is formed by the piston recesses 29, these numbers will occasionally be referred to as identifying the combustion chambers.

Each piston 26 is pivotally connected by means of a piston pin 31 with the upper or small end of a connecting rod 32. The big ends of the connecting rods 32 are journaled upon respective throws 33 of a crankshaft 34. The crankshaft 34 is rotatably journaled within a crankcase chamber 35. The crankcase chamber 35 is formed by a skirt 36 of the cylinder block 24 and a crankcase member 37 that is affixed to the skirt 36 in any known manner. As is typical with two-cycle engine practice, the crankcase chambers 35 associated with each of the cylinder bores 25 are sealed from each other.

An induction and charge-forming system, indicated generally by the reference numeral 38 is provided for supplying a fuel air charge to these crankcase chambers 37. This system includes an air inlet device 39 which has inlet openings (not shown) that draw air from within the protective cowling 13. As is known in this art, the cowling 13 is provided with an atmospheric air inlet so that atmospheric air for engine combustion can be drawn into it. The inlet device 39 may also be configured so as to provide silencing for the inducted air charge.

The air inlet device 39 delivers air that has been inducted into a throttle body assembly, indicated generally by the reference numeral 41 and having a plurality of induction passages 42 each of which is aligned with a respective one of the crankcase chambers 35. Each induction passage 42 is configured, however, so that its center line is offset from the center line of the crankcase chambers 35. The reason for this offsetting will be described later.

The throttle body 41 rotatably journals at a plurality of throttle valve shafts 43 upon which butterfly-type throttle valves 44 are fixed. On one side of the engine, each throttle valve shaft 43 is provided with a throttle lever 45 (see also FIG. 4) which is connected to a synchronizing linkage system 46 so that all of the throttle valve shafts 43 will be rotated in unison. One of the throttle valve shafts 43 has a unique throttle lever 45, indicated at 47 in FIG. 3 so as to afford a cam and follower connection to a throttle valve actuating cam 48.

The throttle actuating cam 48 is journaled on the side of the throttle body assembly 41 by means of a pivot pin 49. An actuating link 51 is connected at one end to the throttle actuating cam 48 and at the other end to a manually operated throttle lever 52. The throttle lever 52 is journaled on a shaft 53 which is operated by a remote throttle operating mechanism.

The throttle body 41 is connected to an intake manifold 55 which is affixed to the crankcase member 37 in a suitable manner. It will be seen that manifold openings 56 are fed by offset portions of the throttle body 41 downstream of the intake passages 42 so as to deliver the charge substantially across the width of each crankcase chamber 35.

As is well known in this art, read-type check valves 57 are provided in each of the manifold openings 56 so as to permit the flow of charge into the crankcase chambers 35 and the pistons 26 are moving upwardly in the cylinder bores 25. The reed-type valves 57 will close when the pistons move downwardly to compress the charge therein.

The thus compressed charge is then transferred to the combustion chambers 29 through one or more scavenge passages (not shown).

Fuel is mixed with the inducted air charge by means of fuel injectors, indicated generally by the reference numeral 58. The fuel injectors 58 are mounted in mounting ports 59 in the throttle body 41 so that they spray into the passages 55 downstream of the throttle valve 44. The aforenoted offsetting of the center of the throttle body passages 42 permits the fuel injectors to be positioned so that their spray axis is generally parallel to the manifold intake passages 56 and the center of the reed-type check valves 57. This ensures uniform fuel distribution.

The fuel injectors 58 may be of the electrically-operated type. That is, they are provided with a solenoid operated pintle valve to control the opening and closing of discharge nozzle ports which in turn spray into the manifold passages as aforedescribed. Since the actual construction of the fuel injectors 58 forms no part of the invention, except for their orientation and their relation to the throttle valves 44, a further description of their construction is not believed to be necessary to permit those skilled in the art to practice the invention.

Fuel is supplied to the fuel injectors by a fuel supply system that includes a remotely positioned fuel tank which is preferably located within the hull of the watercraft 24. This fuel is delivered through a quick disconnect connector (not shown) to a low-pressure fuel pump 59 that is mounted in the protective cowling 13 on the side of the engine 12 opposite the injectors 58. Fuel is drawn by the fuel pump 59 through a fuel filter 61 which is in direct connection with the aforenoted disconnect coupling to the external fuel tank.

Fuel is then transferred from the low-pressure fuel pump 59 to a vapor separator assembly 62 that is mounted in the protective cowling 14 on the side adjacent the fuel injectors 58. This vapor separator 62 may include a high-pressure fuel pump 63 which then supplies fuel to a fuel rail 64 that feeds the fuel injectors 58 in a known manner. A pressure regulator may also be provided so as to regulate the pressure that is delivered to the fuel rail 64.

The fuel/air charge thus formed is, as aforenoted, delivered to the combustion chambers 29 through the engine scavenging system. This charge is then fired by means of spark plugs 69 that are mounted in the cylinder head assemblies 27 (FIG. 1). These spark plugs 69 are fired under the control of an ECU and ignition system (not shown).

The entire engine system may be managed by such an ECU and it is provided with various signals of engine operation and ambient conditions for the control strategy. This may include a throttle position signal indicated by a throttle position sensor 71 that is mounted on the engine and which cooperates with one of the throttle valve shafts 43 in a well-known manner. Since the control strategy forms no part of the invention, further description of it is not believed to be necessary to permit those skilled in the art to practice the invention.

The charge which is ignited will burn and expand and drive the pistons 26 downwardly in the cylinder bores 25. Eventually, exhaust ports 72 formed in the sides of the cylinder block 24 will be opened and the exhaust gases can flow into an exhaust manifold 73 formed in the valley between the cylinder banks by means of an exhaust collector assembly, indicated generally by the reference numeral 74. These exhaust gases are then discharged to the atmosphere through any known type of exhaust system which may include a through-the-hub, high-speed, underwater exhaust discharge.

Figure 3:
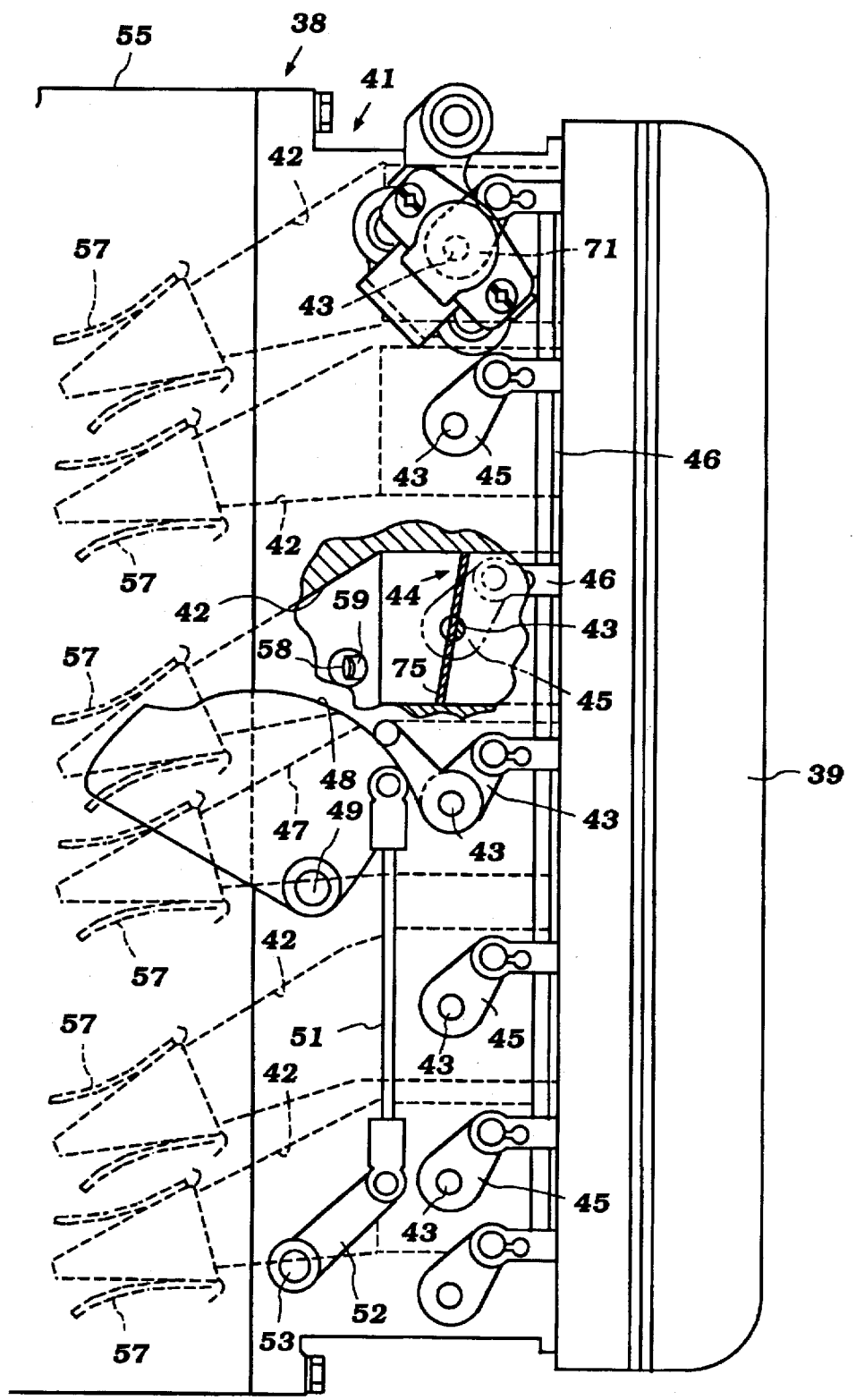
FIG. 3 is an enlarged view looking in the direction of the arrow 3 in FIG. 2 and with a portion broken away so as to show throttle valve linkage and the relationship of the fuel injectors to the throttle valve.
Figure 4:
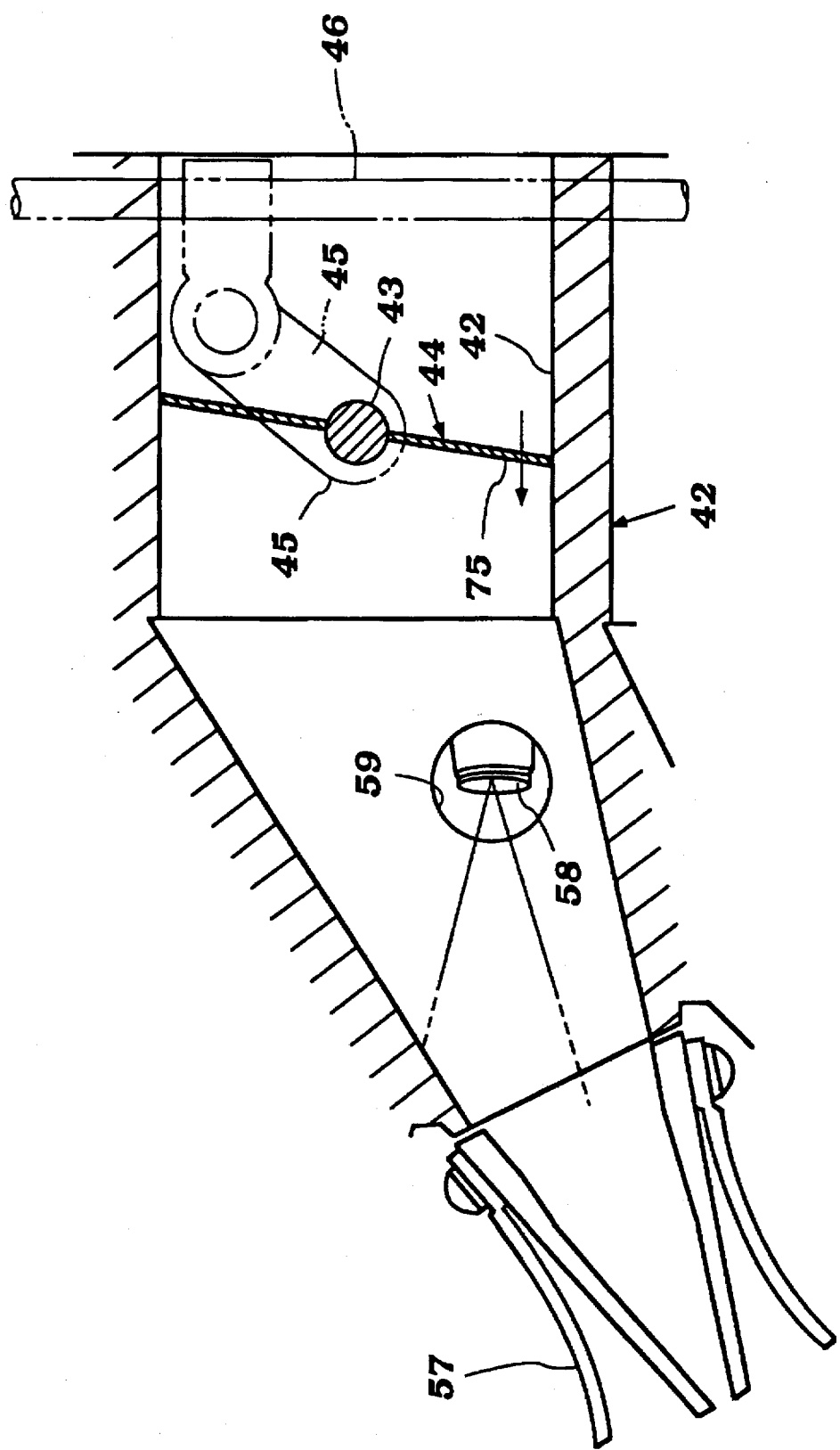
FIG. 4 is a further enlarged cross sectional view of the broken away portion shown in FIG. 3.

An important feature of the invention deals with the mounting of the fuel injectors 58 in the throttle bodies 41 and their relationship to the throttle valves 44. Under normal running conditions when the throttle valves 44 are substantially opened, the fuel spray from the injectors 58 will be well mixed when it is delivered to the crankcase chambers 35. However, under low speed and low load running conditions when the throttle valves 44 are substantially or fully closed, as shown in FIGS. 3 and 4, the flow velocity will be very slow. Also, it may difficult to position the discharge nozzle portion of the fuel injector 58 and specifically the discharge port 59 in the throttle body 41 where the flow velocity is the highest. This is complicated by the offsetting of the injector nozzles 58 from the throttle body flow passage 42 in which the throttle valves 44 are positioned.

Therefore, in accordance with the invention, a small bleed type hole 75 is formed in each of the throttle valves 44 in a position that is substantially aligned with the nozzle port 59 and the spray axis of the fuel injector 58 as clearly seen in FIGS. 3 and 4. Also, as seen in FIG. 2, this hole 75 is offset to one side of the throttle valve 44 so as to be further in alignment with the spray nozzle. Hence, the air flow velocity through the throttle valve opening 75 even under idle conditions will be relatively high and will be directly aligned with the flow from the fuel injector 58.

Hence, there will be good vaporization of the fuel and good mixture distribution. In addition, this flow velocity will ensure that the fuel cannot and will not impinge on the walls of the intake passage. That is, the fuel will be picked up by the high speed air flow and will be directed along with it centrally into the manifold openings 56.

Also, the use of the small hole 75 and its size may be tailored so that the throttle valves 42 may be held in their fully closed position at idle. In other words, the size of the opening 75 may be tailored so as to provide all of the idling air requirements for the engine.

The hole 75 is positioned in the portion of the valve 44 which is on the downstream side of the valve shaft 43 when the throttle valve 44 is in its idle position. This permits the hole 75 to be closely disposed to the injector 58. Thus the acceleration in flow velocity caused by the hole 75 will not be dissipated before it reaches the injected fuel. Also when the throttle valve 44 is opened the flow will still be concentrated in the area of fuel spray.

Therefore, it should be readily apparent that the described construction is very effective in ensuring good fuel distribution even under low speed, low load conditions and the extremely difficult idle or below idle condition as may exist at trolling. Of course, the foregoing description is that of preferred embodiment of the invention, and various changes and modifications may be made without departing from the spirit and scope of the invention, as defined by the appended claims.

What is claimed is:

1. A fuel injection system for an internal combustion engine having an induction passage communicating at its downstream end with a combustion chamber, a throttle valve in said induction passage for controlling the flow therethrough, a fuel injector for injecting fuel into said induction passage downstream of, but in proximity to, said throttle valve when said throttle valve is in its closed position, said fuel injector having a nozzle portion defining a spray axis that extends into said intake passage and means for providing a small effective flow area passage extending across said throttle valve at least when said throttle valve is in said closed position and substantially coextensive with the spray axis of said fuel injector so that the air flow path through said passage is substantially coextensive with the fuel spray path.

2. A fuel injection system for an internal combustion engine as set forth in claim 1, wherein the small effective flow passage is formed by the body of the throttle valve.

3. A fuel injection system for an internal combustion engine as set forth in claim 2, wherein the flow passage is formed on one side of the throttle valve.

4. A fuel injection system for an internal combustion engine as set forth in claim 3, wherein the flow passage is formed on the downstream side of the throttle valve which moves into the downstream side of the intake passage as the throttle valve is opened.

5. A fuel injection system for an internal combustion engine as set forth in claim 3, wherein the throttle valve flow passage is a generally circular opening.

6. A fuel injection system for an internal combustion engine as set forth in claim 5, wherein the flow passage is formed on the downstream side of the throttle valve which moves into the downstream side of the intake passage as the throttle valve is opened.

7. A fuel injection system for an internal combustion engine as set forth in claim 2, wherein the throttle valve comprises a butterfly-type throttle valve supported on a throttle valve shaft that extends across the induction passage.

8. A fuel injection system for an internal combustion engine as set forth in claim 7, wherein the flow passage is formed on one side of the throttle valve.

9. A fuel injection system for an internal combustion engine as set forth in claim 8, wherein the flow passage is formed on the downstream side of the throttle valve which moves into the downstream side of the intake passage as the throttle valve is opened.

10. A fuel injection system for an internal combustion engine as set forth in claim 8, wherein the throttle valve flow passage is a generally circular opening.

11. A fuel injection system for an internal combustion engine as set forth in claim 10, wherein the flow passage is formed on the downstream side of the throttle valve which moves into the downstream side of the intake passage as the throttle valve is opened.

12. A fuel injection system for an internal combustion engine as set forth in claim 1, wherein the induction passage communicates with a crankcase chamber of the engine and further including a reed type check valve at the termination of said intake passage and in general alignment with the spray axis of the fuel injector.

13. A fuel injection system for a two-cycle crankcase compression internal combustion engine having an intake passage terminating at an intake port communicating with a crankcase chamber of said engine, a reed type check valve positioned at said intake port for permitting flow from said intake passage into said crankcase chamber and for precluding reverse flow from said crankcase chamber into said intake passage, a fuel injector disposed in said intake passage and having a spray axis directed generally toward said reed type check valve for spraying fuel into said intake passage, a butterfly-type throttle valve positioned in said induction passage on the upstream side of said fuel injector for controlling the airflow through said intake passage, said fuel injector being mounted at one side of said intake passage, and an airflow opening formed in said throttle valve on the same side of said intake passage as said fuel injector is positioned and defining a flow path that is substantially coextensive with the flow of fuel from said fuel injector.

* * * * *